US011449206B2

(12) United States Patent
Mall

(10) Patent No.: US 11,449,206 B2
(45) Date of Patent: *Sep. 20, 2022

(54) MACHINE LEARNING METHOD OF MANAGING CONVERSATIONS IN A MESSAGING INTERFACE

(71) Applicant: ATLASSIAN PTY LTD, Sydney (AU)

(72) Inventor: Orpheus Mall, San Francisco, CA (US)

(73) Assignee: ATLASSIAN PTY LTD., Sydney (AU)

( * ) Notice: Subject to any disclaimer, the term of this patent is extended or adjusted under 35 U.S.C. 154(b) by 24 days.

This patent is subject to a terminal disclaimer.

(21) Appl. No.: 16/859,915

(22) Filed: Apr. 27, 2020

(65) Prior Publication Data
US 2020/0257421 A1    Aug. 13, 2020

Related U.S. Application Data

(63) Continuation of application No. 15/798,277, filed on Oct. 30, 2017, now Pat. No. 10,635,271, which is a continuation of application No. 15/194,400, filed on Jun. 27, 2016, now Pat. No. 9,804,752.

(51) Int. Cl.
| | |
|---|---|
| *G06F 3/048* | (2013.01) |
| *G06F 3/0484* | (2022.01) |
| *H04L 51/04* | (2022.01) |
| *H04L 51/212* | (2022.01) |
| *H04L 51/216* | (2022.01) |
| *H04L 67/01* | (2022.01) |

(Continued)

(52) U.S. Cl.
CPC ............ *G06F 3/0484* (2013.01); *H04L 51/04* (2013.01); *H04L 51/212* (2022.05); *H04L 51/216* (2022.05); *H04L 67/01* (2022.05); *H04L 67/535* (2022.05); *G06N 20/00* (2019.01)

(58) Field of Classification Search
CPC ....... G06F 3/0484; H04L 51/12; H04L 67/42; H04L 51/16; H04L 67/22; H04L 51/04; G06N 20/00
See application file for complete search history.

(56) References Cited

U.S. PATENT DOCUMENTS

| | | |
|---|---|---|
| 4,964,077 A | 10/1990 | Eisen |
| 5,208,748 A | 5/1993 | Flores |
| 5,496,177 A | 3/1996 | Collia |

(Continued)

OTHER PUBLICATIONS

Kooti et al., "Evolution of Conversations in the Age of Email Overload", Proceedings of the 24th International Conference on World Wide Web (WWW '15), pp. 603-613, dated May 18, 2015.

(Continued)

*Primary Examiner* — Aleksey Olshannikov
(74) *Attorney, Agent, or Firm* — Brownstein Hyatt Farber Schreck, LLP

(57) ABSTRACT

A method for managing contacts in a messaging application includes displaying, by a client device executing a messaging application, a list of a plurality conversations associated with the client device, determining, by the client device, an amount of time that the messaging application has been in use, displaying, by the client device and based on a rating value, a particular conversation from the list using a different appearance from other conversations of the list, wherein the rating value is based in part on the amount of time.

20 Claims, 7 Drawing Sheets

(51) Int. Cl.
*H04L 67/50* (2022.01)
*G06N 20/00* (2019.01)

(56) References Cited

U.S. PATENT DOCUMENTS

| | | | |
|---|---|---|---|
| 6,072,894 | A | 6/2000 | Payne |
| 6,121,968 | A | 9/2000 | Arcuri |
| 6,795,808 | B1 | 9/2004 | Strubbe |
| 7,035,903 | B1 | 4/2006 | Baldonado |
| 7,325,234 | B2 | 1/2008 | Smith |
| 7,596,540 | B2 | 9/2009 | Tzruya |
| 7,877,781 | B2 | 1/2011 | Lim |
| 8,032,598 | B1 | 10/2011 | He |
| 8,520,855 | B1 | 8/2013 | Kohno |
| 9,881,295 | B1 | 1/2018 | Buddhavarapu |
| 2003/0085928 | A1 | 5/2003 | Ekkel |
| 2003/0163537 | A1 | 8/2003 | Rohall |
| 2003/0233419 | A1 | 12/2003 | Beringer |
| 2004/0098462 | A1 | 5/2004 | Horvitz |
| 2004/0210587 | A1 | 10/2004 | Reysa |
| 2005/0198128 | A1 | 9/2005 | Anderson |
| 2005/0198173 | A1 | 9/2005 | Evans |
| 2005/0204009 | A1 | 9/2005 | Hazarika |
| 2005/0223066 | A1 | 10/2005 | Buchheit |
| 2005/0234910 | A1* | 10/2005 | Buchheit ............... G06F 16/248 |
| 2005/0262203 | A1 | 11/2005 | Buchheit |
| 2006/0010217 | A1 | 1/2006 | Sood |
| 2006/0069734 | A1 | 3/2006 | Gersh |
| 2006/0116139 | A1 | 6/2006 | Appelman |
| 2007/0047697 | A1 | 3/2007 | Drewry |
| 2007/0179945 | A1 | 8/2007 | Marston |
| 2008/0005319 | A1 | 1/2008 | Anderholm |
| 2008/0126930 | A1 | 5/2008 | Scott |
| 2008/0313292 | A1 | 12/2008 | Forstall |
| 2009/0063991 | A1 | 3/2009 | Baron |
| 2009/0138828 | A1 | 5/2009 | Schultz |
| 2009/0313554 | A1 | 12/2009 | Haynes |
| 2010/0076989 | A1 | 3/2010 | Jakobson |
| 2010/0088377 | A1 | 4/2010 | Johnson |
| 2010/0281397 | A1 | 11/2010 | Buchheit |
| 2011/0035687 | A1 | 2/2011 | Katis |
| 2011/0119599 | A1 | 5/2011 | Klassen |
| 2011/0185288 | A1 | 7/2011 | Gupta |
| 2011/0202598 | A1 | 8/2011 | Evans |
| 2011/0213852 | A1 | 9/2011 | Radenkovic |
| 2012/0054642 | A1 | 3/2012 | Balsiger |
| 2012/0124147 | A1 | 5/2012 | Hamlin |
| 2012/0124148 | A1 | 5/2012 | Hamlin |
| 2012/0124483 | A1 | 5/2012 | Zuckerberg |
| 2012/0143972 | A1 | 6/2012 | Malik |
| 2012/0158582 | A1 | 6/2012 | Nuzzi |
| 2012/0158728 | A1 | 6/2012 | Kumar |
| 2012/0198001 | A1 | 8/2012 | DeLuca |
| 2012/0203851 | A1 | 8/2012 | Hardy |
| 2012/0209924 | A1 | 8/2012 | Evans |
| 2012/0254770 | A1* | 10/2012 | Ophir ...................... H04L 51/22 715/752 |
| 2013/0013716 | A1 | 1/2013 | Buchheit |
| 2013/0024788 | A1 | 1/2013 | Olsen |
| 2013/0097560 | A1 | 4/2013 | Park |
| 2013/0125058 | A1 | 5/2013 | Lee |
| 2013/0125061 | A1 | 5/2013 | Lee |
| 2013/0125062 | A1 | 5/2013 | Lee |
| 2013/0159930 | A1 | 6/2013 | Paretti |
| 2013/0179522 | A1 | 7/2013 | Hardy |
| 2014/0012927 | A1 | 1/2014 | Getzfield |
| 2014/0013249 | A1 | 1/2014 | Moeinfar |
| 2014/0201201 | A1 | 7/2014 | Song |
| 2014/0298257 | A1 | 10/2014 | Grandhi |
| 2015/0032829 | A1 | 1/2015 | Barshow |
| 2015/0066863 | A1 | 3/2015 | Sehrer |
| 2015/0088784 | A1 | 3/2015 | Dhara |
| 2015/0095228 | A1 | 4/2015 | Su |
| 2015/0095758 | A1 | 4/2015 | Rossi |
| 2015/0127749 | A1 | 5/2015 | Mishanski |
| 2015/0200878 | A1 | 7/2015 | Shih |
| 2015/0215245 | A1 | 7/2015 | Carlson |
| 2015/0288633 | A1* | 10/2015 | Ogun ................... H04L 12/1822 709/206 |
| 2015/0302098 | A1 | 10/2015 | Hern |
| 2015/0358764 | A1 | 12/2015 | Piemonte |
| 2015/0381813 | A1 | 12/2015 | Pearce |
| 2016/0065524 | A1 | 3/2016 | Umapathy |
| 2016/0065527 | A1 | 3/2016 | Umapathy |
| 2016/0080303 | A1 | 3/2016 | Deolalikar |
| 2016/0080304 | A1 | 3/2016 | Hamlin |
| 2016/0125383 | A1 | 5/2016 | Chan |
| 2016/0132670 | A1 | 5/2016 | Salama |
| 2016/0132990 | A1 | 5/2016 | Zhang |
| 2016/0179932 | A1 | 6/2016 | Ghafourifar |
| 2016/0182661 | A1 | 6/2016 | Brezina |
| 2016/0255037 | A1* | 9/2016 | Spivack ................. G06Q 10/10 706/12 |
| 2016/0269379 | A1 | 9/2016 | Livesay |
| 2017/0124038 | A1 | 5/2017 | Upadhyay |
| 2017/0228584 | A1 | 8/2017 | Studnicka |
| 2017/0265046 | A1* | 9/2017 | Chen ....................... H04W 4/06 |
| 2018/0046340 | A1 | 2/2018 | Mall |

OTHER PUBLICATIONS

Backstrom et al.. "Characterizong and Curating Conversation Threads: Expansion, Focus, Volume, Re-Entry", Proceedings of the Sixth ACM International Conf. Feb. 4, 2013, pp. 13-22.
Burwell, U.S. Appl. No. 15/798,277, filed Oct. 30, 2017, Office Action dated Nov. 4, 2019.
Burwell, U.S. Appl. No. 15/798,277, filed Oct. 30, 2017, Notice of Allowance dated Feb. 26, 2020.
Burwell, U.S. Appl. No. 15/798,277, filed Oct. 30, 2017, Interview Summary dated Dec. 26, 2019.
Burwell U.S. Appl. No. 15/194,400, filed Jun. 27, 2016, Notice of Allowance dated Jun. 30, 2017.
Burwell, U.S. Appl. No. 15/194,400, filed Jun. 27, 2016, Interview Summary dated Feb. 27, 2017.
Burwell, U.S. Appl. No. 15/798,277, filed Oct. 30, 2017, Interview Summary dated Feb. 11, 2020.
Burwell U.S Appl. No. 15/194,400, filed Jun. 27, 2016, Office Action dated Nov. 18, 2016.

* cited by examiner

| | |
|---|---|
| Jim 300 | Jim (5/1/16 12:15pm): Hey Dude whats up!<br>Me (5/1/16 12:16pm): Not much man.<br>Jim (5/1/16 12:16pm): Want to grab some lunch?<br>Me (5/1/16 12:18pm): Yea, meet you downstairs in 5mins?<br>Jim (5/1/16 12:19pm): Cya there. |
| Bob 305 | |
| Ann 310 | |
| Lunch Group 315 | |

FIG. 3A

| Jim 300 | Bob 305 | Lunch Group 315 | |

Bob (4/8/16 3:30pm): Did you get that thing done?
Me (4/8/16 3:30pm): Almost, give me another hour.
Bob (4/8/16 3:31pm): Ok.

FIG. 3D

MACHINE LEARNING METHOD OF MANAGING CONVERSATIONS IN A MESSAGING INTERFACE

BENEFIT CLAIM

This application claims the benefit under 35 U.S.C. § 120 as a Continuation of application Ser. No. 15/798,277 filed Oct. 30, 2017, which is a Continuation of application Ser. No. 15/194,400 filed Jun. 27, 2016, now U.S. Pat. No. 9,804,752, issued on Oct. 31, 2017, the entire contents of which are hereby incorporated by reference as if fully set forth herein. Applicant hereby rescinds any disclaimer of claim scope in the parent applications or the prosecution history thereof and advises the USPTO that the claims in this application may be broader than any claim in the parent applications.

TECHNICAL FIELD

The present disclosure generally relates to improved methods, computer software or computer hardware in the field of messaging applications. The disclosure relates more specifically to improved computer-implemented methods for managing the display of information within the messaging application, including updating graphical user interface displays based upon levels of computer interaction with messaging contacts represented in contact records.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Messaging applications are ubiquitous in modern life—seemingly every computing device has one or more installed, and individuals may use many throughout the day. In messaging applications, many different kinds of information may be displayed, such as chat rooms, messages, timestamps, or a list of conversations or people. The displayed information, however, may become unnecessarily long or complex, and may detract from the user experience. Thus, improved methods are needed to manage the display of information within the messaging application.

SUMMARY

The appended claims may serve as a summary of the invention.

BRIEF DESCRIPTION OF THE DRAWINGS

In the drawings:

FIG. 3A, FIG. 3B, FIG. 3C, FIG. 3D each illustrate different aspects of graphical user interfaces, and updating techniques for graphical user interfaces, in screen displays of a hypothetical messaging application.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections according to the following outline:

1. OVERVIEW
2. EXAMPLE SYSTEM IMPLEMENTATION
3. EXAMPLE FUNCTIONAL IMPLEMENTATION
4. IMPLEMENTATION EXAMPLE
5. HARDWARE OVERVIEW
6. EXTENSIONS AND ALTERNATIVES

1. Overview

Computer-implemented techniques are provided for managing display of information within a messaging application. In one embodiment, a displayed list of conversations is managed by determining a rating value for each conversation and fading a display of conversations associated with a low rating value. The faded conversations are removed from the displayed list of conversations after an amount of time has passed within the messaging application. A faded conversation is returned to a "normal" display and the rating value associated with the faded conversation is increased if there is interaction with the conversation, such as selecting or continuing the conversation.

Specifically, in one embodiment, a method, computer readable medium, or computer system involves: receiving, by a server computer that is hosting a messaging application, a request from a client device that is executing a second instance of the messaging application relating to obtaining a plurality of conversations associated with the client device; in response to the request, retrieving data corresponding to the plurality of conversations that are associated with the client device and causing displaying a list of the plurality of conversations on the client device; determining, by the server computer and based on a least one of a plurality of conversation attributes, a rating value for each conversation among the plurality of conversations; identifying, by the server, a particular conversation of the plurality of conversations wherein the rating value associated with the particular conversation is below a threshold rating value; in response to identifying the particular conversation, causing updating the list that is displayed on the client device by removing the particular conversation from the list of the plurality of conversations that is displayed on the client device.

Other aspects, features and embodiments will become apparent from the disclosure as a whole.

2. Example System Implementation

Figure 1:
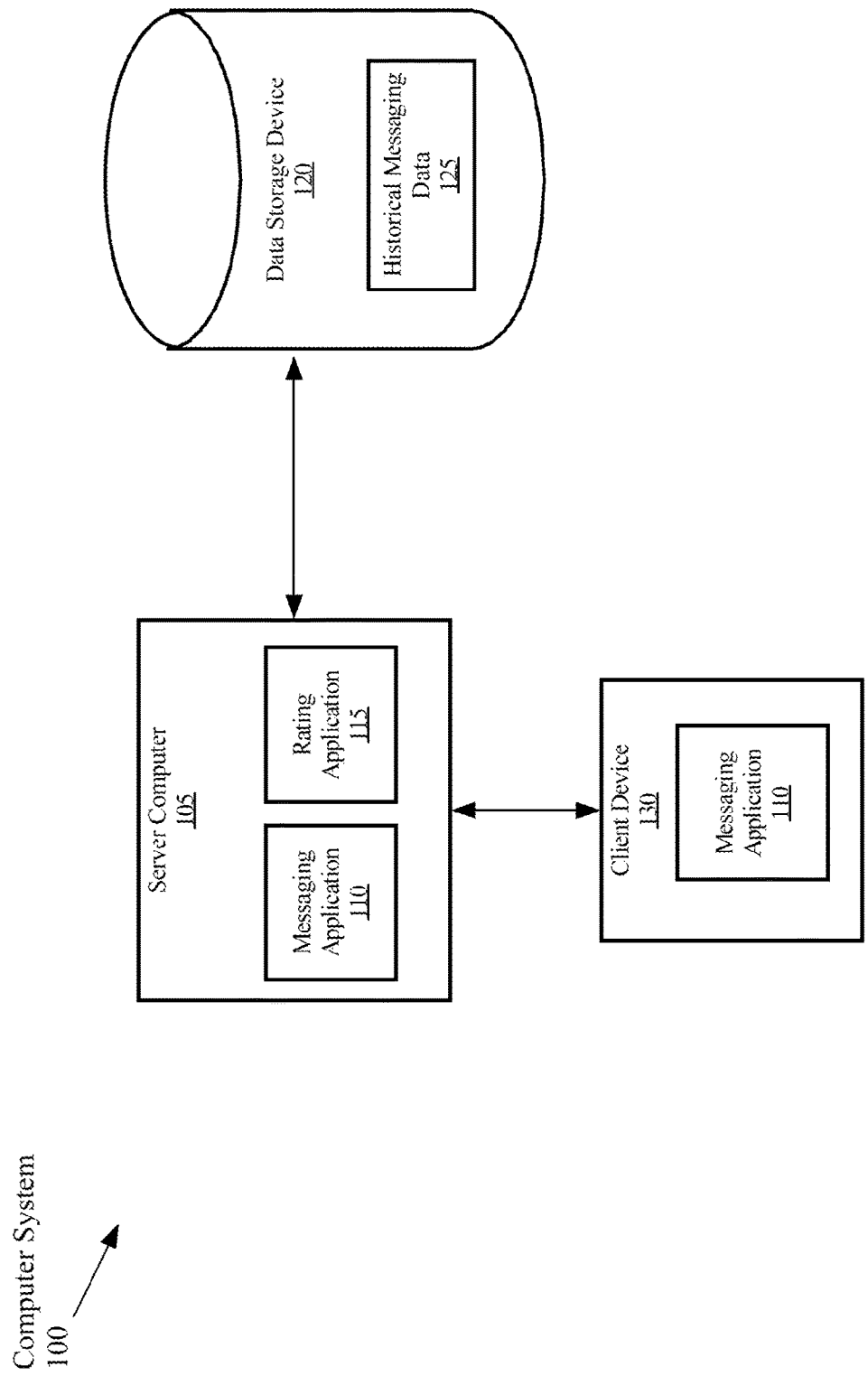
FIG. 1 illustrates a computer system in accordance with an embodiment of the invention.

FIG. 1 illustrates an example computer system in which the techniques described may be practiced, according to some embodiments.

In one embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. Computer system 100 illustrates only one of many possible arrangements of components configured to execute the programming described herein. Other arrangements may include fewer or different components, and the division of work between the components may vary depending on the arrangement.

Computer system 100 includes server computer 105, messaging application 110, rating application 115, data storage device 120, historical messaging data 125, and client device 130. In one embodiment, server computer 105 may be a multitenant service provider computer owned by, operated by, or associated with an application service provider that provides an online, real-time application program based upon software as a service (SaaS) environment that is used by or accessible to multiple tenants, and accessed using client computers coupled over one or more networks to server computer 105. Alternatively, server computer 105 may be any computing device, and may be owned or operated on the behalf of a single entity, such as a behind the firewall server for a business. Server computer 105 is communicatively connected to data storage device 120 and client device 130 using any suitable wired or wireless connection, including, but not limited to: a Local Area Network (LAN), a Wide Area Network (WAN), the Internet, a company network, etc. Server computer 105 executes messaging application 110 and rating application 115.

In one embodiment, data storage device 120 may be any suitable storage device such as one or more hard disk drives, memories, or any other electronic digital data recording device configured to store data. Although data storage device 120 is depicted as a single device in FIG. 1, data storage device 120 may span multiple devices located in one or more physical locations. For example, data storage device 120 may be one or more nodes of one or more data warehouse(s). Additionally, in one embodiment, data storage device 120 may be located on the same device(s) as server computer 105. Alternatively, data storage device 120 may be located on a separate device(s) from server computer 105.

Data storage device 120 may include one or more databases implemented using any suitable methodology, such as a relational database, a columnar database, etc. The database may be of any size, portioned into any number of rows, columns, or tables, and may be organized in any manner. In a multitenant embodiment, data stored on data storage device 120 may relate to any number of different tenants, such as hundreds to thousands of tenants or more depending on resource capacity and throughput. The data stored on data storage device 120 may relate to any type of data, such as chat or messaging application data, personal information, business information, governmental data, health data, environmental data, or police or military data. Individual data records may have any number of fields, components, or other aspects.

In one embodiment, data storage device 120 stores historical messaging data 125. Historical messaging data 125 may be files, messages, notifications, user data, chat room data, metadata, or other information created by or related to messaging application 110. Examples include, but are not limited to:

conversation attributes, including but not limited to a conversation frequency value, a conversation length value in characters, words, or otherwise, a conversation age value, a location value, a time zone value, an amount of links shared, a number of documents shared, invitation data, a distance value specifying a geographical distance between members of a conversation, or a department value specifying an organizational unit that is associated with members of a conversation;

user account data including, but not limited to: ID, name, email address, password, nickname, job title, time zone, avatar, notifications settings, access privileges, or location;

chat room data including, but not limited to: ID, name, owner, topic, created date, privacy settings, members, participants, statistics, or message retention policy settings;

message data including, but not limited to: message type, from user, to user, file URL, date, mentions, message body, timestamp, message ID, or format;

file attachments including, but not limited to: ID, user ID, name, thumbnail, size, description, or date;

emoticon data including, but not limited to: ID, url, width, height, audio, media file, or user id;

social network data including, but not limited to: relationships (such as who a user friends and/or follows) and actions (such likes, comments, messages, group memberships, etc.);

client data including, but not limited to: client type (such as mobile, browser, desktop, etc.), operating system, or version.

Historical messaging data 125 may be updated in real time as messaging application 110 receives or creates data, or may be updated at predetermined intervals. In a multitenant embodiment, historical messaging data 125 includes data relating to multiple tenants, and the data may be aggregated or anonymized. As discussed below, historical messaging data 125 is used by rating application 115 to train a machine learning algorithm.

In one embodiment, any data stored by the data storage device 120 and/or included in historical messaging data 125 is protected by various security measures to ensure that personal identifiable information (PII) is either removed or stored securely. Any security measures may be used, such as hashing functions, to protect the PII. Additionally, any aggregated data or data that is applied to or used on behalf of multiple users may be anonymized as appropriate. Further, any PII may be stored for a predetermined amount of time to limit the amount of PII that is stored. Any other security measures now known or later developed may also be used.

In one embodiment, client device 130 may be any computing device that is capable of accessing online networks and communicating data, including, but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Further, client device 130 may include applications, such as messaging application 110, operating system software, or other programs. In a multi-tenant embodiment, each tenant comprises one or more client devices, and has a customer relationship with the service provider that owns or operates the service computer 105.

In one embodiment, messaging application 110 is a chat or messaging application. Messaging application 110 is available in multiple versions, such as a multitenant cloud-based SaaS version and a single client server version. Additionally, messaging application 110 includes versions for client devices that may be thin-client or thick-client. Regardless of which version of messaging application 110 is in use, the functionalities provided may be the same, although the distribution of work or actions performed by a given messaging application may vary based on configuration details or the versions used.

Further, in FIG. 1, while messaging application 110 is depicted as executing on both server computer 105 and client device 130, the messaging application depicted is not the exact same messaging application. Rather, different instances of compatible versions are executing on the devices. Regardless of the version or instance used, messaging application 110 provides chat or messaging services including, but not limiting to: sending and receiving text messages, video, audio, images, notifications or alerts, and files in private conversations or group conversations such as a chat room or channel, management tools, and other services needed for a messaging application.

In one embodiment, messaging application 110 comprises program instructions that are programmed or configured to display a list of contacts or conversations and update the displayed list of contacts or conversations. The list of conversations may be displayed within messaging application 110 in any location and any manner. For example, the list of conversations may be displayed on the left side of the display or application, with each conversation being selectable from the list to cause the data associated with that conversation, such as messages, to appear on the right side of the display or application. The list of conversations may be displayed using any size or type of font, including images, emojis or other symbols, highlighting or any other effects.

In an embodiment, the list of conversations includes at least two different ways of displaying a given conversation in the list: normal and faded. A conversation is displayed in a default or normal way, which may be configured by the user or other entity, when a rating value of the conversation indicates that the conversation is important. The use of rating values is described further in other sections herein. A normal display of a conversation may, for example, include black text in a standard font type and size. A conversation is displayed in a faded way, which may be configured by the user or other entity, when the rating value associated with the conversation indicates that the conversation is less important. A faded display of a conversation may, for example, include gray text in a standard font type and size. In general, a faded display of a conversation need only be different than a normal display of a conversation, and should not be limited to the faded example. Thus, different may include, but is not limited to: highlighting, bolding, italicizing, effects such as vibrating or moving text, or any other visual or audio indication that a conversation is different than the normal way to display a conversation in the list of conversations.

The displayed list of conversations may be updated at any time. For example, a particular conversation may change from the normal display to a faded display or the display of a particular faded conversation may be updated, such as from dark gray to light gray. Further still, a conversation may be removed from the list of displayed conversations completely if the rating value is too low, if an allotted amount of time has based, or based on any other factor. In the event that a displayed conversation is removed from the list, the data associated with that conversation is not deleted. Rather, the conversation may still be accessed through menu items or other methods. Removing a conversation from a list merely removes the conversation from display in the list, which is typically the easiest or fastest way to access conversations. The displayed list of conversations may be updated in response to receiving messages from a server or input from a user, or based on any other factor. Optionally, the displayed list may be displayed in an order based on a ranking of the rating values of the conversations included in the displayed list. Messaging application 110 may send or receive input related to the displayed list of conversations in any format or manner.

In one embodiment, messaging application 110 comprises program instructions that are programmed or configured to determine an amount of time that messaging application 110 has been in use. The passage of time is one of the factors used to determine the rating value for a given conversation. However, because the rating value may remove conversations from the list of displayed conversations, a large passage of time without a user accessing the messaging application may inadvertently result in all conversations being removed from the list. For example, consider a messaging application that is used for work on a company computer at the office. If an employee takes a month long vacation, he or she may return to find no conversations in their list, even though conversations from a month ago are very important to him or her, as they are resuming their work from a month ago. Thus, messaging application 110 determines the amount of time that messing application 110 has been in use, and uses that as the passage of time. Thus, if a user works 8 hours a day, uses the messaging application the entire time, and the application is not in use the other 16 hours of the day, time would advance merely 8 hours in a day, instead of the full 24. In other words, when messaging application 110 is not in use, time does not pass for the purposes of determining rating values for conversations. Users, admins, or others may configure when messaging application 110 is in use. For example, messaging application 110 may be in use when the application is running on a client device. Alternatively, messaging application 110 may be in use when the user has the application open and is actively using the application. In an embodiment, the system detects that the user computer is actively using the application when the application is not minimized. Any suitable standard may be used for determining when messaging application 110 is in use and therefore when time passes. In addition to being included in determining the rating value, the passage of time may be used as a threshold value for determining when to remove a conversation from the list of conversations. In other words, a faded conversation may be removed after a threshold amount of time has passed since the conversation was faded, such as three days.

In one embodiment, rating application 115 comprises program instructions that are programmed or configured to determine rating values for conversations relating to a particular client device or user account. The rating value indicates how likely the members are to converse again or how important or relevant a given conversation is. The rating value may be used to fade and ultimately remove conversations from the list of displayed conversations. The rating value may use any scale or values to indicate the importance/relevancy. Specifically, the rating value is determined using a machine learning algorithm that was trained using historical messaging data 125. The rating value for conversations may be determined in response to receiving a request for a list of conversations related a client device. Alternatively, the rating value for conversations may be determined in advance, and updated periodically using any suitable frequency. Rating application 115 may increase the rating value for a given conversation in response to input from the client device. For example, if a conversation was faded and due to be removed from a displayed list, but a user interacted with the conversation to prevent the conversation from being removed, or for any other reason, the rating value associated with that conversation may be increased. Although rating application 115 is depicted in FIG. 1 as executing on the same device as messaging application 110, rating application 115 may execute on a separate physical and/or virtual device from messaging application 110. Further still, rather than being separate applications, the functionality of rating application 115 may be included as part of messaging application 115.

The rating values determined by rating application 115 may be used in conjunction with one or more thresholds to determine when conversations should be faded or removed from the list of displayed conversations. For example, if the scale of the rating value is 0 to 100, then a rating value below 60 may result in fading a conversation, while a rating value below 40 results in removing the conversation from the list of conversations. Any number of thresholds may be used at any values.

In one embodiment, rating application 115 comprises program instructions that are programmed or configured to train a machine learning algorithm. Specifically, the machine learning algorithm is trained using historical messaging data 125. Any data stored in historical messaging data 125 may be used to train the algorithm, and any number of factors may be considered. The machine learning algorithm may be any machine learning algorithm, such as random forest, support vector machines, k-means clustering, density based spatial clustering of applications with noise (DBSCAN), or any other machine learning algorithm. Although the machine learning algorithm is preferably trained using data from many different tenants/customers, the machine learning algorithm may be trained using data from a single customer. Rating application 115 may maintain different versions of the trained algorithm for different customers. For example, employees of business A may value the age or duration of a conversation less than employees of business B, and the algorithm can be adjusted so that the most appropriate conversations will be faded for employees of each business. Alternatively, or in addition, a master trained algorithm is maintained for use across multiple customers. The trained algorithm may be updated/retrained on a periodic basis, such as once a month. Optionally, textual and/or contextual analysis of conversations may be considered by the machine learning algorithm. If social network relationship data is available, then social network relationship analysis may be used to increase the accuracy of the rating value by more accurately defining the extent of a relationship between users/the likelihood of conversing again. In one embodiment, how recent the conversation is, how frequent conversation occurs, and how long conversation is are the main factors to consider from historical messaging data 125, although other factors are also important and may be considered by the algorithm.

3. Example Functional Implementation

Figure 2:
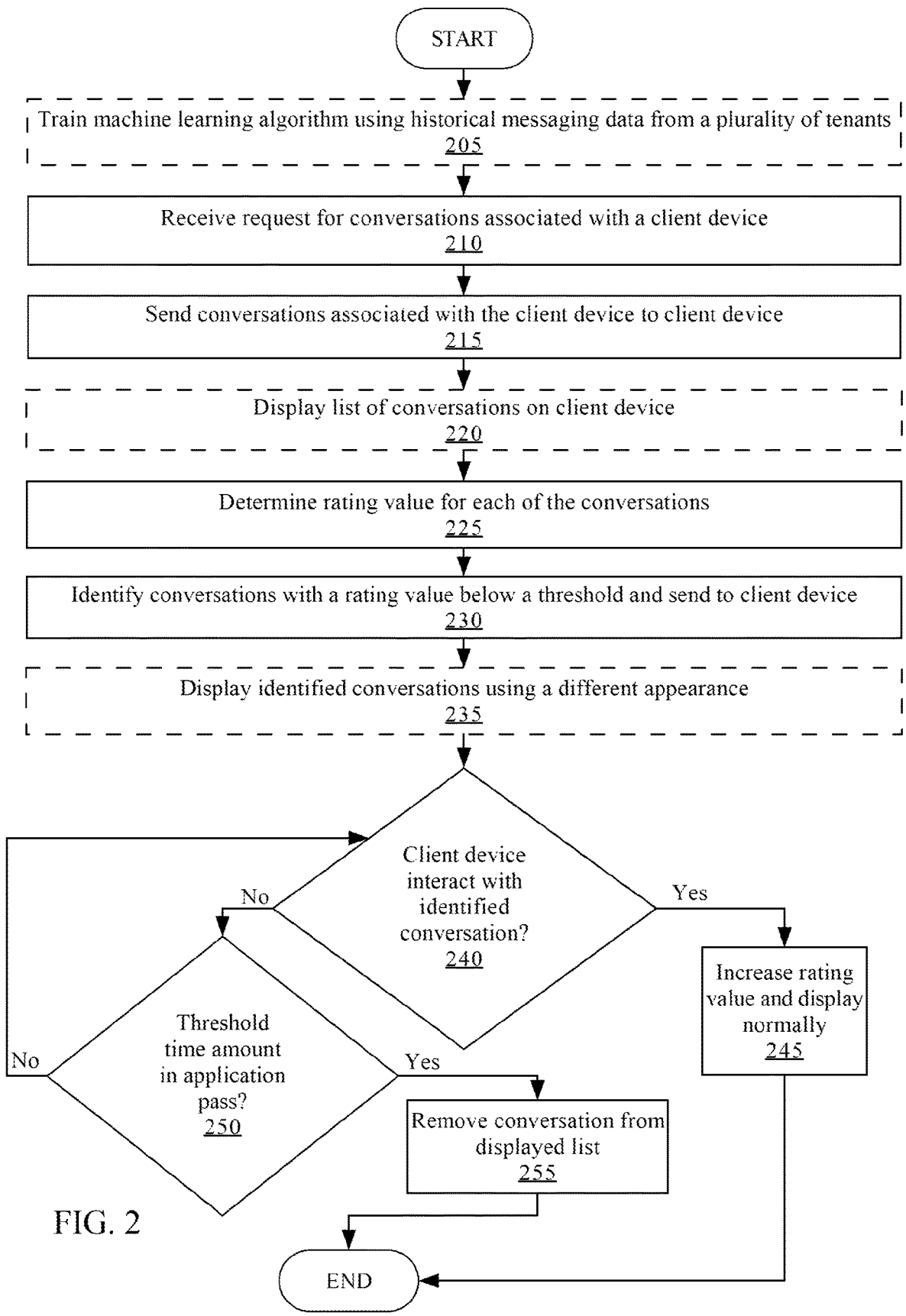
FIG. 2 illustrates a data processing algorithm or method in accordance with an embodiment of the invention.

FIG. 2 shows an example flowchart of a method for managing the display of information within a messaging application. Although the steps in FIG. 2 are shown in an order, the steps of FIG. 2 may be performed in any order, and are not limited to the order shown in FIG. 2. Additionally, some steps may be optional, may be performed multiple times, or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

In step 205, a machine learning algorithm is trained using historical messaging data from a plurality of tenants. The machine learning algorithm is trained using any available data and, as indicated by the dotted lines, may be trained or updated at any time. In one embodiment, the machine learning algorithm is retrained/updated on a weekly basis. The particular machine learning algorithm used may be any machine learning algorithm, such as random forest, support vector machines, k-means clustering, or DBSCAN.

In step 210, a request for conversations associated with a client device is received. The request may be received in any format. The request may be sent by the client device in response to launching a messaging application, or for any other reason. The request may include an identifier or other data necessary to determine which conversations are associated with the client device.

In step 215, conversations associated with the client device are sent to the client device. The conversations may be identified and sent in any manner. The conversations may optionally be provided along with rating values, if step 225 has already been performed. Alternatively, the rating values for conversations may be sent at a later time.

In step 220, a list of conversations is displayed on the client device. The conversations are displayed in any location, such as the left or right side of the display/application. Each conversation within the list of conversations is selectable and, in response to selecting a particular conversation, the messages associated with the conversation are displayed. The list of conversations may be presented in a random order, an order based on rating values, or in any other order.

In step 225, a rating value is determined for each of the conversations. Step 225 may optionally be performed in advance of receiving a request for conversations associated with a client device prior to step 210. Or, step 225 may be performed after the request is received but before the conversations are sent to the client device between steps 210 and 215, or after step 215. The rating value is determined for each conversation based on the algorithm trained in step 205. The rating value is a numeric or other indication of the likelihood of a conversation continuing, or the relative importance of each conversation displayed in the conversation list.

In step 230, conversations with a rating value below a threshold amount are identified and sent to the client device. The threshold amount indicates that a particular conversation is unlikely to continue or is likely to be less important to a user, and should be faded and potentially removed from the list of conversations so that the list of conversations stays uncluttered and more important conversations stay easily accessible. The threshold amount may be set to any value, and may vary from business to business or individual user to individual user.

In step 240, a determination is made whether the client device has interacted with any of the identified conversations. Interacting with the identified conversations may include selecting or clicking on the conversation, sending a new message, receiving a new message, or any other action. If the client device has not interacted with an identified conversation, the method proceeds to step 250. If the client device has interacted with an identified conversation, the method proceeds to step 245.

In step 245, the rating value is increased and the conversation is displayed normally. The rating value may be increased by any amount, on a temporary or permanent basis. The feedback received from the client device, such as interaction with the conversation may be taken into account when the machine learning algorithm is retrained or updated to further improve the accuracy. Once the display is updated, the conversation is displayed normally and is no longer pending removal. However, if the rating slips below the threshold again the conversation may return to faded status, and the display would be updated accordingly.

In step 250, a determination is made whether a threshold time amount has passed in the application. The threshold time amount may be set to any amount of time, such as 24 hours, 3 days, a week, or any other amount, and may be determined by the rating or other suitable algorithm. Time passes in the application when the application is in use—either when the application is running or executing, when the user has the application open and is actively interacting with the application, or other suitable standard. Importantly, if a user were to go on vacation for example, time should not pass, so that when the user returns from vacation, their conversation list is not empty.

In step 255, an identified conversation is removed from the displayed list. The identified conversation may be removed in any manner. Once removed, the data associated with the conversation is not deleted. Rather, the conversation is merely removed from the list of displayed conversations, and is still accessible to the user through other, typically slower, methods such as a menu or toolbar. If a user were to access the removed conversation through other methods, the conversation may be returned to the list of displayed conversations.

4. Implementation Example

Each of FIG. 3A, FIG. 3B, FIG. 3C, FIG. 3D illustrates a graphical user interface screen display of a messaging application in different states of use or updating, as part of an example of managing the display of information within a messaging application. The example shown in FIG. 3A, FIG. 3B, FIG. 3C, and FIG. 3D is shown in schematic or simplified format for purposes of illustrating a clear example, and other embodiments may use other panels, windows, widgets, text, graphics or other display elements or information.

Referring first to FIG. 3A, a mock computer screen display of a messaging application is shown. In the computer screen display, the conversation list is shown on the left hand side, and 4 different conversations are listed: Jim 300, Bob 305, Ann 310, and a group chat named lunch group 315. The conversation with Jim 300 has been selected, as indicated by the bolded outline around the conversation, and thus the messages associated with that conversation are displayed on the right hand side of the computer screen display, showing Jim and the user discussing meeting up for lunch on May 1, 2016 around 12:15 pm.

Figure 3B:
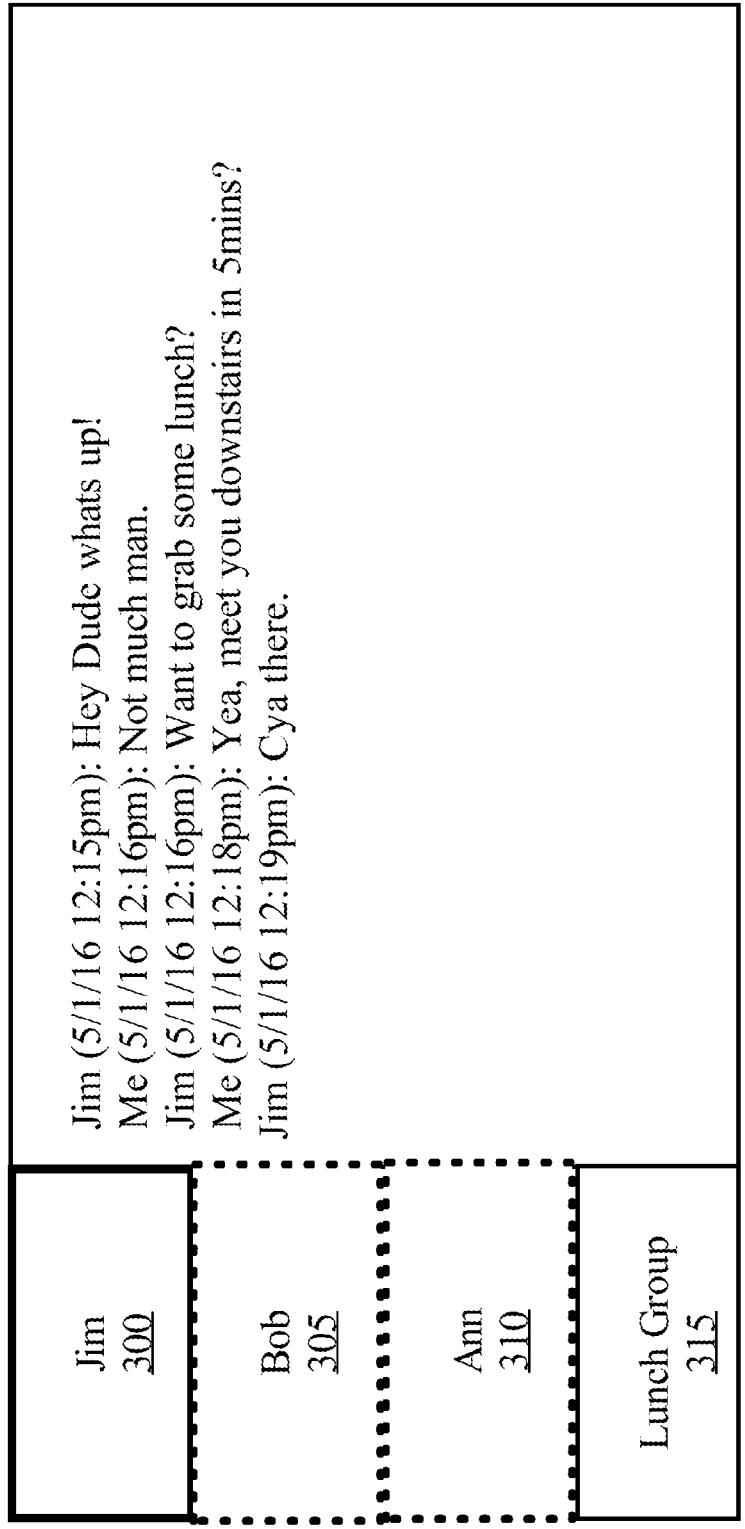

Turning to FIG. 3B, the computer screen display shows that the displayed conversation list has been updated based on rating values, and that the conversations with Bob 305 and Ann 310 have been faded due to their rating value being below a threshold amount. The fade is depicted in FIG. 3B as the dotted outline around each of the conversations for Bob 305 and Ann 310. The conversation with Jim 300 is still selected in FIG. 3B, as indicated by the bolded outline around that conversation.

Figure 3C:
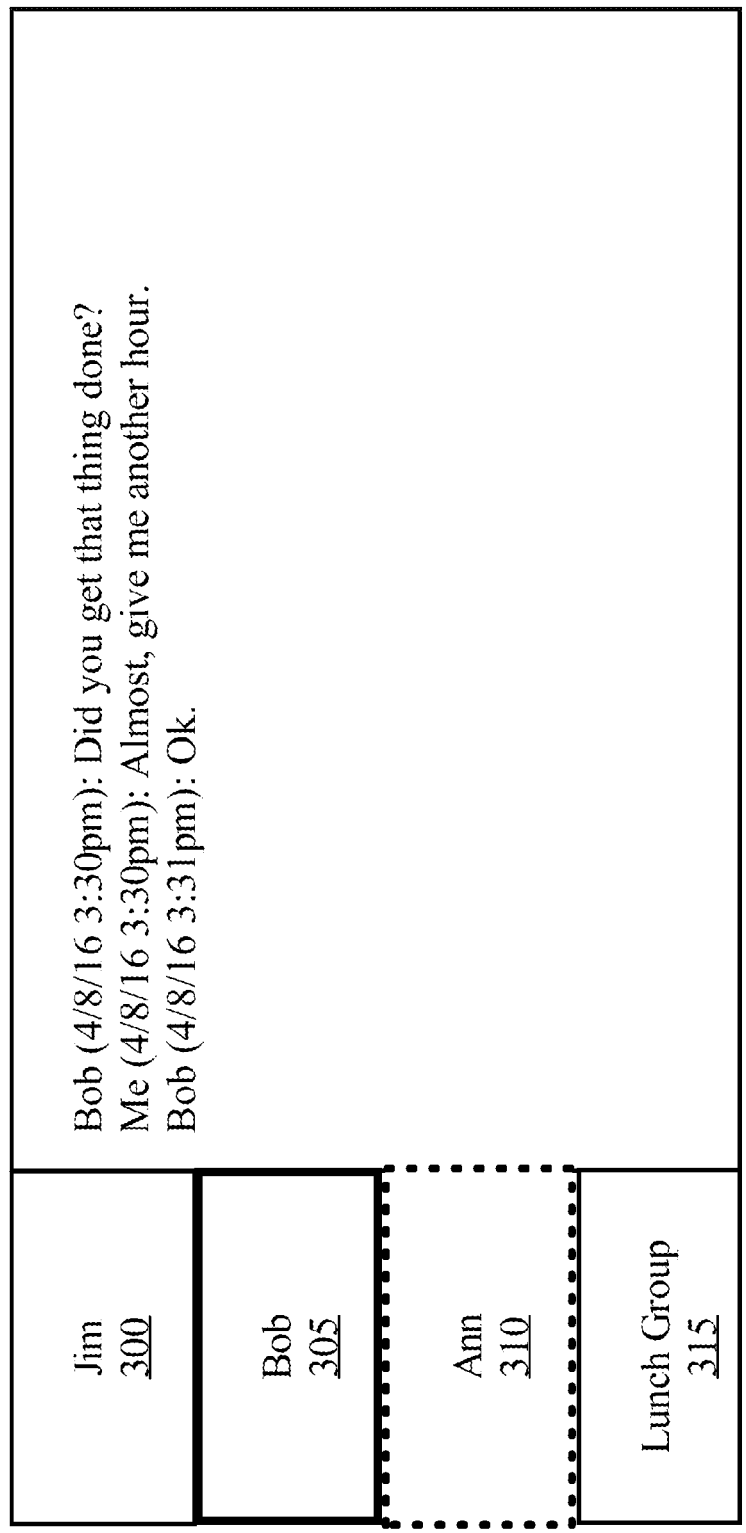

Moving to FIG. 3C, the user saw that the conversation with Bob 305 was faded and may be removed soon, but the user did not want that conversation removed. Thus, the user interacted with the conversation with Bob 305 by selecting the conversation, as indicated by the now-bolded outline of around the conversation with Bob 305. By selecting the conversation, the messages associated with the conversation are now displayed on the right side, showing that no messages have been sent since Apr. 8, 2016. Thus, one of the reasons for fading the conversation with Bob 305 may have been that a sufficient amount of time had passed in the application that rating value for the conversation had declined below the threshold. By selecting the conversation with Bob 305, the rating value has been increased, and the conversation is no longer faded.

Moving to FIG. 3D, the user did not deem the conversation with Ann 310 important so the user did not interact with the conversation and, therefore, after an amount of time, the conversation with Ann 310 was removed from the displayed list, which is depicted in FIG. 3D.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired or program logic to implement the techniques.

Figure 4:
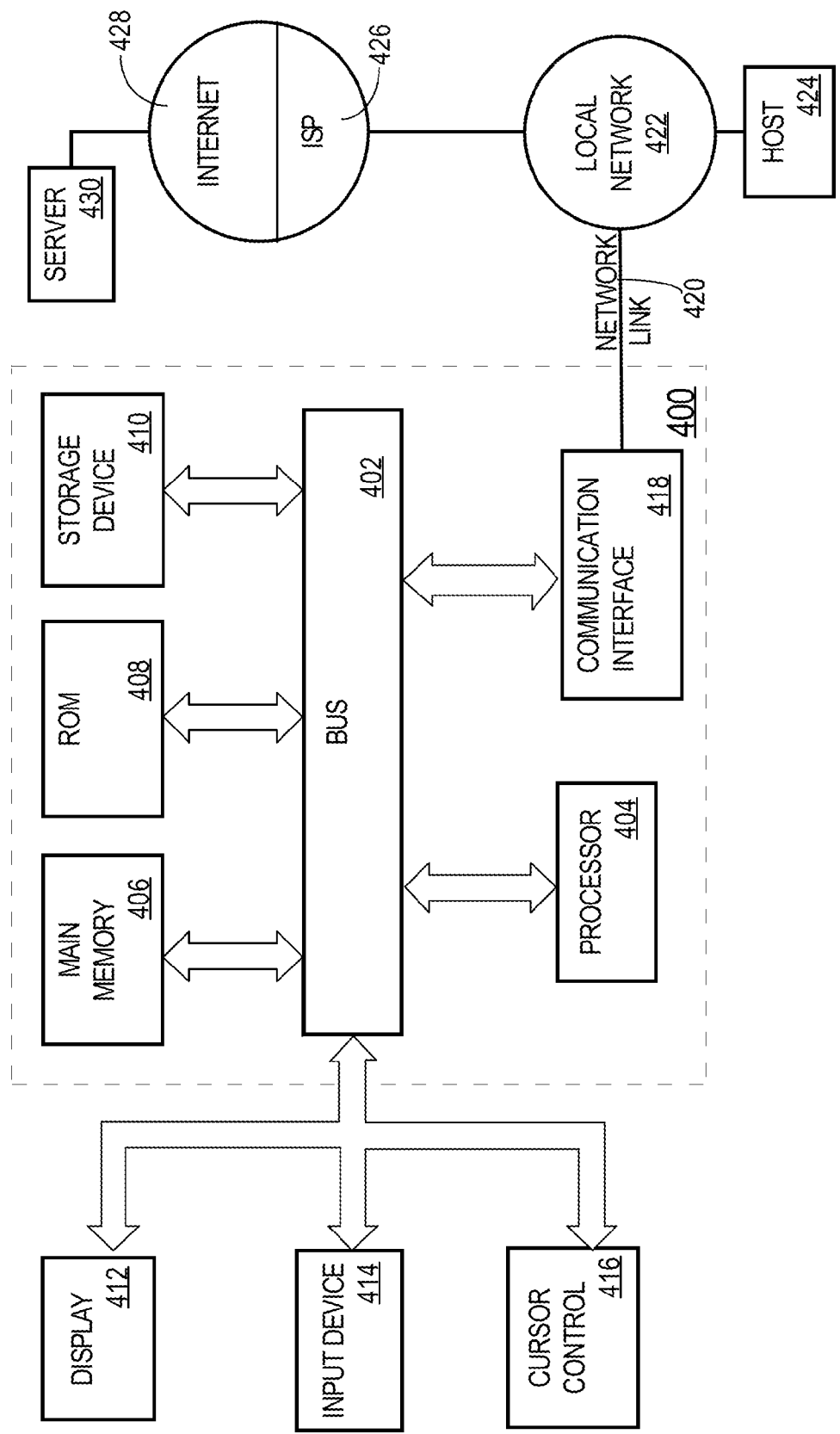
FIG. 4 shows a block diagram of a computer system with which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, or stored in storage device 410, or other non-volatile storage for later execution.

6. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computer-implemented method of managing display of a plurality of digital conversations communicated through a messaging application, the computer-implemented method comprising:

causing, by a processor, display of a messaging interface including a set of conversation listings, each conversation listing of the set of conversation listings comprising a respective selectable region within a listing area, a selection within the respective selectable region causes display of a respective set of messages associated with a respective conversation in a message area that is separate and distinct from the listing area;

causing, by the processor, display of a particular conversation listing of a particular conversation of the set of conversation listings, a particular selectable region of the particular conversation listing having a different appearance from selectable regions being displayed based on a rating value of the particular conversation that is in a first range, the rating value indicating a likelihood to resume the particular conversation or a degree of relevancy of the particular conversation;

receiving, by the processor, after display of the particular conversation listing in the different appearance, an indication of an interaction with the particular conversation listing; and in response to receiving the indication of the interaction with the particular conversation listing, updating the rating value of the particular conversation and causing display of the particular selectable region of the particular conversation listing in a normal appearance.

2. The computer-implemented method of claim 1, further comprising training a machine learning model for determining the rating value of the particular conversation based on historical messaging data associated with one or more users of the messaging application, the historical messaging data indicating how recent the particular conversation is, how frequently the particular conversation occurs, how long the particular conversation is, or how strong a social network relationship is between parties of the particular conversation, the rating value of the particular conversation being computed using the machine learning model.

3. The computer-implemented method of claim 1, further comprising:
 computing a respective rating value for each conversation of a set of conversations associated with the messaging interface;
 identifying a subset of conversations of the set of conversations, each conversation of the subset of conversations having the respective rating value in the first range; and
 sending the subset of conversations with the respective rating value to a device before causing display of the particular conversation listing of the particular conversation.

4. The computer-implemented method of claim 1, further comprising:
 determining, after causing display of the particular conversation listing, that the rating value of the particular conversation has fallen into a second range different from the first range; and
 in response to the determining that the rating value of the particular conversation has fallen into the second range, stopping display of the particular conversation listing of the particular conversation.

5. The computer-implemented method of claim 4, wherein the second range is based on an amount of time that has passed in the messaging application when the messaging application is running, executing, or receiving user interactions.

6. The computer-implemented method of claim 1, wherein the different appearance includes an appearance with fading, highlighting, bolding, italicizing, vibrating, or moving text.

7. A computer-implemented method of managing display of a plurality of digital conversations communicated through a messaging application, the computer-implemented method comprising:
 causing display of a messaging interface including a set of conversation listings associated with a set of conversations, each conversation listing of the set of conversation listings comprising a respective selectable region within a listing area, a selection within the respective selectable region causes display of a respective set of messages associated with a respective conversation in a message area that is separate from the listing area; the respective selectable region being selectable in one step for showing the respective conversation;
 causing, in response to a change of a rating value of a particular conversation of the set of conversations, display of the set of conversation listings except for a particular conversation listing corresponding to the particular conversation; and
 after causing display of the set of conversation listings except for the particular conversation listing corresponding to the particular conversation:
  enabling a mechanism involving more than one step for showing the particular conversation;
  receiving an activation of the mechanism; and
  causing, in response to the activation, re-display of the particular conversation listing.

8. The computer-implemented method of claim 7, wherein the mechanism includes a menu or a toolbar.

9. The computer-implemented method of claim 7, further comprising:
 in response to causing re-display of the particular conversation listing of the particular conversation, causing display of a particular selectable region of the particular conversation in a different appearance from other selectable regions being displayed based on the rating value of the particular conversation being in a first range; and
 increasing the rating value of the particular conversation in response to an interaction with the particular conversation listing and causing display of the particular conversation listing in a normal appearance.

10. The computer-implemented method of claim 9, further comprising:
 after causing display of the particular conversation listing in the normal appearance, detecting that the rating value of the particular conversation falls in the first range; and
 causing display of the particular conversation listing in the difference appearance.

11. The computer-implemented method of claim 9, wherein the different appearance includes an appearance with fading, highlighting, bolding, italicizing, vibrating, or moving text.

12. The computer-implemented method of claim 7, further comprising:
 causing display of the particular conversation listing of the set of conversation listings in a different appearance from other conversation listings of the set of conversation listings based on the rating value of the particular conversation being in a first range;
 receiving, after display of the particular conversation listing in the different appearance, an indication of an interaction with the particular conversation listing; and
 in response to the indication, updating the rating value of the particular conversation and causing display of the particular conversation listing in a normal appearance.

13. The computer-implemented method of claim 7, wherein the change of the rating value of the particular conversation is based on an amount of time that has passed in the messaging application when the messaging application is running, executing, or receiving user interactions.

14. The computer-implemented method of claim 7, further comprising:
 sending a request for a list of conversations associated with a client device; and
 receiving the set of conversations with a corresponding set of rating values.

15. One or more non-transitory computer-readable storage media storing instructions which, when executed by one or more processors, cause the one or more processors to execute a method of managing display of a plurality of digital conversations communicated through a messaging application, the method comprising:
 causing display of a messaging interface including a set of conversation listings, each conversation listing of the set of conversation listings comprising a respective selectable region positioned within a listing area, a selection within the respective selectable region causes display of a respective set of messages associated with a respective conversation, the respective set of messages positioned in a message area that is separate from the listing area;

causing display of a particular conversation listing of a particular conversation of the set of conversation listings, a particular selectable region of the particular conversation listing having a different appearance from other selectable regions being displayed based on a rating value of the particular conversation that is in a first range, the rating value indicating a likelihood to resume the particular conversation or a degree of relevancy of the particular conversation;

receiving after display of the particular conversation listing in the different appearance, an indication of an interaction with the particular conversation listing; and in response to receiving the indication of the interaction with the particular conversation listing, updating the rating value of the particular conversation and causing display of the particular selectable region of the particular conversation listing in a normal appearance.

16. The one or more non-transitory computer-readable storage media of claim 15, the method further comprising training a machine learning model for determining the rating value of the particular conversation based on historical messaging data associated with one or more users of the messaging application, the historical messaging data indicating how recent the particular conversation is, how frequently the particular conversation occurs, how long the particular conversation is, or how strong a social network relationship is between parties of the particular conversation, the rating value of the particular conversation being computed using the machine learning model.

17. The one or more non-transitory computer-readable storage media of claim 15, the method further comprising:
computing a respective rating value for each conversation of the set of conversations associated with the messaging interface;
identifying a subset of conversations of the set of conversations, each conversation of the subset of conversations having the respective rating value in the first range; and
sending the subset of conversations with the respective rating value to a device before causing display of the particular conversation listing of the particular conversation.

18. The one or more non-transitory computer-readable storage media of claim 15, the method further comprising:
determining, after causing display of the particular conversation listing, that the rating value of the particular conversation has fallen into a second range different from the first range; and
in response to the determining that the rating value of the particular conversation has fallen into the second range, stopping display of the particular conversation listing of the particular conversation.

19. The one or more non-transitory computer-readable storage media of claim 18, wherein the second range is based on an amount of time that has passed in the messaging application in terms of when the messaging application is running, executing, receiving user interactions.

20. The one or more non-transitory computer-readable storage media of claim 15, wherein the different appearance includes an appearance with fading, highlighting, bolding, italicizing, vibrating, or moving text.

* * * * *